(12) United States Patent
Liang et al.

(10) Patent No.: US 9,378,415 B2
(45) Date of Patent: Jun. 28, 2016

(54) RECOGNITION METHOD AND RECOGNITION DEVICE FOR SHEET-TYPE MEDIUM

(71) Applicant: GRG Banking Equipment Co., Ltd., Guangzhou, Guangdong (CN)

(72) Inventors: Tiancai Liang, Guangzhou (CN); Weifeng Wang, Guangzhou (CN); Kun Wang, Guangzhou (CN); Yuanchao Yu, Guangzhou (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 14/416,621

(22) PCT Filed: Jul. 5, 2013

(86) PCT No.: PCT/CN2013/078914
§ 371 (c)(1),
(2) Date: Jan. 22, 2015

(87) PCT Pub. No.: WO2014/107947
PCT Pub. Date: Jul. 17, 2014

(65) Prior Publication Data
US 2015/0178560 A1    Jun. 25, 2015

(30) Foreign Application Priority Data
Jan. 11, 2013   (CN) .......................... 2013 1 0012084

(51) Int. Cl.
*G06K 9/00*  (2006.01)
*G06K 9/40*  (2006.01)
*G06T 3/40*  (2006.01)

(52) U.S. Cl.
CPC ........ *G06K 9/00463* (2013.01); *G06K 9/00791* (2013.01); *G06K 9/40* (2013.01); *G06T 3/4007* (2013.01); *G06K 2209/01* (2013.01)

(58) Field of Classification Search
CPC .......... G06K 9/00791; G06K 9/00463; G06K 2209/01; G06K 9/40; G06T 3/4007
USPC .......................................................... 382/137
See application file for complete search history.

(56) References Cited

FOREIGN PATENT DOCUMENTS

| CN | 102034108 A | 4/2011 |
| CN | 102034108 B | * 6/2012 |
| CN | 102722708 A | 10/2012 |
| CN | 103106412 A | 5/2013 |
| WO | WO 2014107947 A1 | * 7/2014 ......... G06K 9/00791 |

OTHER PUBLICATIONS

International Search Report dated Oct. 24, 2013 from corresponding International Application PCT/CN2013/078914.

* cited by examiner

*Primary Examiner* — Gregory F Cunningham
(74) *Attorney, Agent, or Firm* — Wolf, Greenfield & Sacks, P.C.

(57) ABSTRACT

The present invention relates to a recognition method and a recognition device for a sheet-type medium. The method comprises: step 1, collecting image information; step 2, splitting from the image information collected image information of an object-to-be-recognized; step 3, reconstructing image data of a feature area, extracting a feature on the reconstructed image data, and forming an eigenvector; and, step 4, sending the eigenvector into a standard data-trained classifier, and acquiring a recognition result. The method has an image reconstructed on the basis of feature area prior information, improves image quality, facilitates increased recognition accuracy, and, because only the image area that requires feature extraction is reconstructed, reduces storage space consumption. This not only saves large amounts of storage space and time and increases resource utilization rate, but also increases recognition accuracy and achieves an improved balance between resource and efficiency.

4 Claims, 6 Drawing Sheets

RECOGNITION METHOD AND RECOGNITION DEVICE FOR SHEET-TYPE MEDIUM

This application is the national phase of International Application No. PCT/CN2013/078914, filed on Apr. 2, 2013, which claims the priority Chinese Patent Application No. 201310012084.6, entitled "RECOGNITION METHOD AND RECOGNITION DEVICE FOR SHEET-TYPE MEDIUM", filed on Jan. 11, 2013 with the State Intellectual Property Office of People's Republic of China, which applications are hereby incorporated by reference to the maximum extent allowed by law.

FIELD

The disclosure relates to pattern recognition technology based on image information, and in particular to a method and a device for recognizing a sheet-medium according to image information.

BACKGROUND

In the field of image-based pattern recognition, an image to be recognized is collected by a sensor, and if the image has poor resolution, accuracy of recognition results greatly decreases, particularly for recognition among confusing recognition objects, such as "O" and "D", etc, in character recognition. Though computer technology is developing rapidly, in consideration of cost, a hardware platform only satisfying actual need instead of a high-end hardware platform may be selected. In this case, in practical manufacturing process, due to differences of hardware and diversity of recognition space, a lot of recognition errors for confusing objects may occur.

There are usually two existing solutions. One is to update hardware devices to improve image resolution, and the other one is to improve a recognition algorithm to improve recognition accuracy. In the first solution, the problem of recognition errors for confusing objects can be completely solved, but in this way resolution of the entire image is improved and accordingly information collecting device, storage device and processor, etc, need to be updated, which greatly increases production cost and weakens product competitiveness. In the second solution, signal reconstruction technology is used for processing the collected signal, to improve a ratio between useful signal data volume to noise data volume and improve signal quality. However, in the actually collected signal, the useful signal data volume is much larger than the noise data volume, and in this case reconstructing all collected signals causes large amount of data processing and slow algorithm processing speed. Therefore, this solution is not ideal even though the recognition accuracy may be improved to certain extent.

Hence, it is very important to provide an image-based character recognition method with fast processing speed and high recognition accuracy in the technical field of sheet-medium recognition and classification.

SUMMARY

The disclosure is to provide a sheet-medium recognition method to distinguish and classify sheet-media or valuable documents such as banknotes, etc, and to implement accurate recognition among confusing objects in case of poor image resolution.

A sheet-medium recognition device is also provided according to the disclosure to implement accurate recognition for a sheet-medium through executing the foregoing recognition method.

The sheet medium recognition method includes: step 1, collecting image information; step 2, separating image information of an object to be recognized out of the collected image information; step 3, reconstructing image data of a feature region, and extracting a feature from the reconstructed image data to form an eigenvector; and step 4, inputting the eigenvector into a classifier trained through standard data to acquire a recognition result.

Reconstructing image data of the feature region in step 3 includes:

assuming that image information of the object to be recognized is A, A is a m×n image, and f(h,w) represents a gray value of an element in row h and column w of the image A, where h=1,2, . . . ,m and w=1,2, . . . ,n; and assuming that a $m_1 \times n_1$ image B with a higher resolution is to be reconstructed, and g(i, j) represents a gray value of an element in row i and column j of the image B, where i=1,2, . . . , $m_1$, and j=1, 2, . . . , $n_1$;

assuming that $$\Delta x = \frac{n_1}{n}, \Delta y = \frac{m_1}{m}, x = \frac{j}{\Delta x} \text{ and } y = \frac{i}{\Delta y};$$

if x and y are both integers, then g(i,j)=f(y,x);

if x is non-integer, y is integer, and x is rounded down to $w_x$, then $$g(i,j)=(w_x+1-x) \cdot f(y,w_x)+(x-w_x) \cdot f(y,w_x+1)$$

if x is integer, y is non-integer, and y is rounded down to $h_y$, then $$g(i,j)=(h_y+1-y) \cdot f(h_y,x)+(y-h_y) \cdot f(h_y+1,x)$$

if x is non-integer, y is non-integer, x is rounded down to $w_x$ and y is rounded down to $h_y$, then $$g(i,j)=(h_y+1-y) \cdot ((w_x+1-x) \cdot f(h_y,w_x)+(x-w_x) \cdot f(h_y,w_x+1))+(y-h_y) \cdot ((w_x+1-x) \cdot f(h_y+1,w_x)+(x-w_x) \cdot f(h_y+1,w_x+1))$$

In addition, extracting the feature in step 3 includes: step 31, assuming that a matrix $$\begin{pmatrix} a_{11} & \cdots & a_{1n} \\ \cdots & \cdots & \cdots \\ a_{m1} & \cdots & a_{mn} \end{pmatrix}$$

represents two-dimensional gray image data A, $a_{ij}$ represents a gray value of a pixel point in row i and column j of the image data, where i=1,2, . . . , m and j=1,2, . . . , n, assuming that Boxlist={$box_1, box_2, \ldots, box_n$}, where $box_i$ represents an ith image region in the image data A from which the feature is to be extracted, acquiring $box_i$ from the Boxlist; step 32, acquiring data $$B_i = \begin{pmatrix} b_{11} & \cdots & b_{1q} \\ \cdots & \cdots & \cdots \\ b_{p1} & \cdots & b_{pq} \end{pmatrix}$$

for the image feature region designated by $box_i$; step 33, reconstructing $$C_i = \begin{pmatrix} c_{11} & \cdots & c_{1t} \\ \cdots & \cdots & \cdots \\ c_{u1} & \cdots & c_{ut} \end{pmatrix}$$

from data $B_i$ of the feature region and storing $C_i$ into a designated position, where t>q and u>p; step 34, determining whether all feature regions are reconstructed, executing step 35 if all feature regions are reconstructed, and repeating step 31 to step 33 to acquire a group of image regions $C_1, C_2, \ldots, C_n$ if not all feature regions are reconstructed; and step 35, extracting needed features from the image regions $C_1, C_2, \ldots, C_n$ to form eigenvectors $\beta_1, \beta_2, \ldots, \beta_n$.

The sheet-medium recognition device includes an image collection unit, configured to acquire image information of a sheet medium to be recognized; an image separation unit configured to implement adaptive separation on the image of the sheet medium; a feature region reconstruction unit, configured to implement image reconstruction for a feature region, and store the reconstructed image data of the feature region into a designated position; a feature extraction unit, configured to extract a feature from the reconstructed image data of the feature region to form an eigenvector; a data storage unit, configured to store position information of pre-set feature regions and standard template data; a recognition unit, configured to classify and recognize an input eigenvector; and a recognition result outputting unit, configured to output a result for the classification and recognition which is acquired by the recognition unit.

In the sheet-medium recognition method according to the disclosure, an image is reconstructed according to priori information of feature regions to improve quality of the image, which is beneficial for improving recognition accuracy. Since the reconstruction is performed only in the regions for which features are to be extracted, storage space consumption is reduced, thereby not only saving a lot of storage space and time, improving resource utilization rate, but also effectively improving recognition accuracy, and reaching a balance between resource and efficiency.

DETAILED DESCRIPTION

Technical solutions of the embodiments of the present disclosure are described completely and clearly with the drawings of the embodiments of the disclosure. Apparently, the described embodiments are merely a few rather than all of the embodiments of the present disclosure. Any other embodiments obtained by persons of ordinary skill in the art based on the embodiments of the present disclosure without creative efforts shall fall within the protection scope of the present disclosure.

Figure 4:
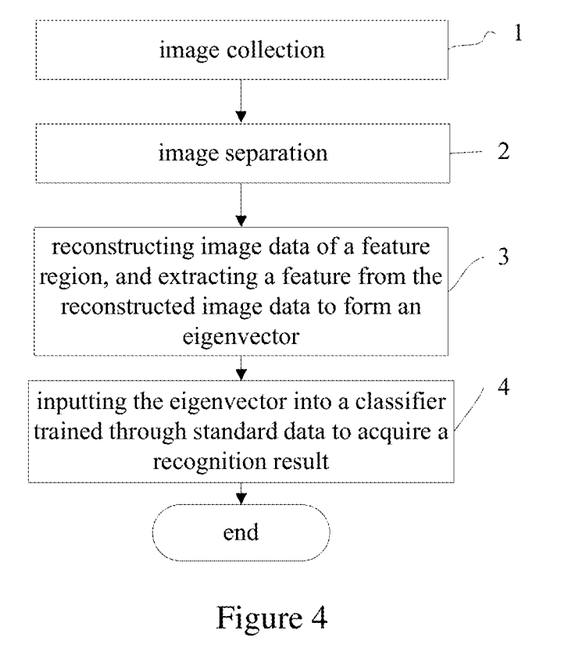
FIG. 4 is a flow chart of a sheet-medium recognition method.

In this embodiment, a banknote having a denomination of RMB 50 yuan is taken as an object to be recognized, to illustrate a sheet-medium recognition method and a sheet-medium recognition device. Referring to FIG. 4, the sheet medium recognition method includes following steps.

Figure 7:
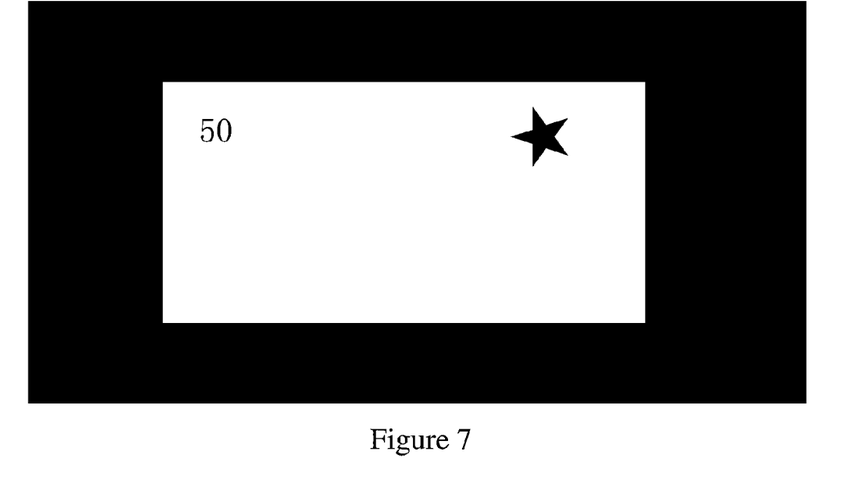
FIG. 7 is a schematic diagram of a sheet-medium signal collected by a sheet-medium recognition device.

Step 1 includes: collecting image information, where the collected image information is shown in FIG. 7.

Figure 8:
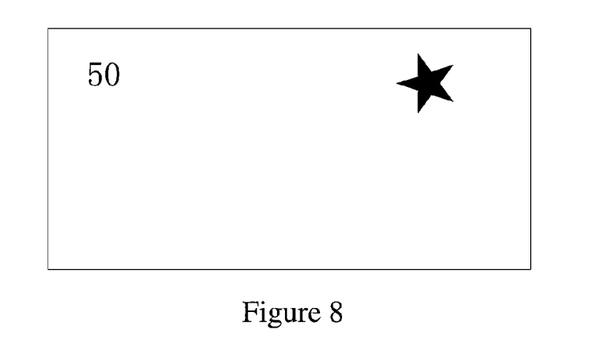
FIG. 8 is a schematic diagram of a sheet-medium separated from background.
Figure 9:
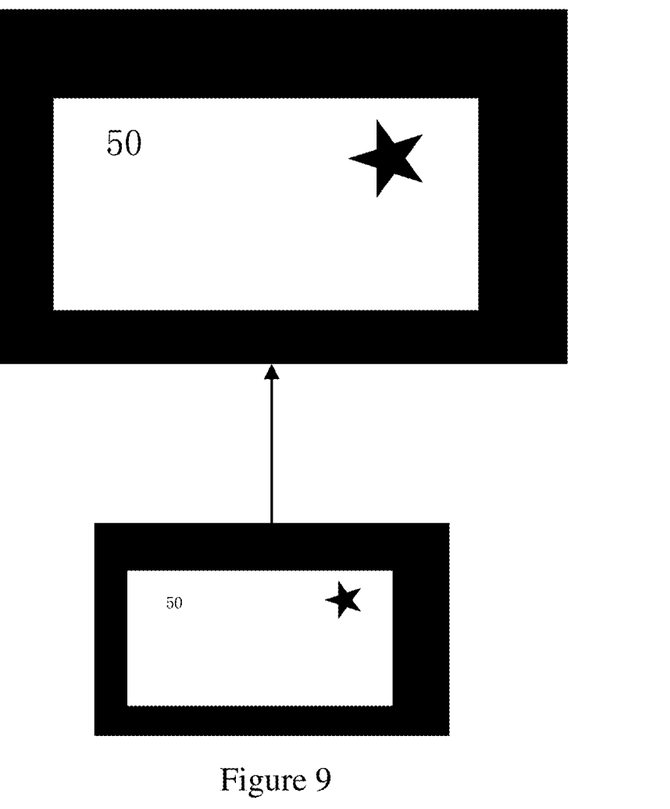
FIG. 9 is a comparison diagram for sheet-medium signals which are respectively collected before and after hardware update.

Step 2 includes: separating image information of an object to be recognized out of the collected image information, as shown in FIG. 8.

Figure 5:
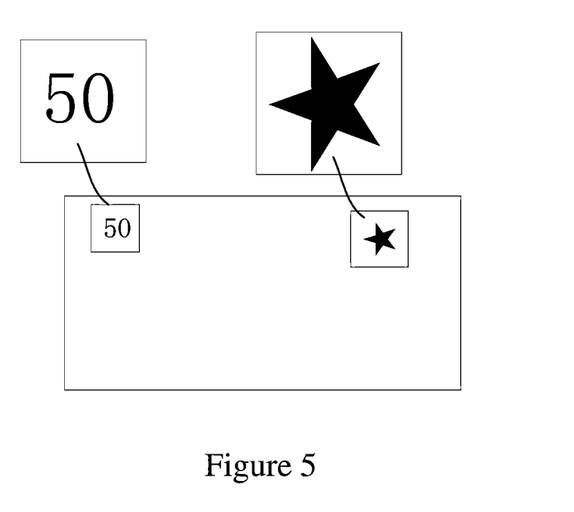
FIG. 5 shows effect for image reconstruction of a feature region.

Step 3 includes: reconstructing image data of a feature region as shown in FIG. 5, and extracting a feature from the reconstructed image data to form an eigenvector.

Step 4 includes: inputting the eigenvector into a classifier trained through standard data to acquire a recognition result.

Step 5, ending the process.

Reconstructing the image data of the feature region in step 3 includes:

assuming that image information of the object to be recognized is A, A is a m×n image, and f(h,w) represents a gray value of an element in row h and column w of the image A, where h=1, 2, . . . , m, and w=1, 2, . . . , n; and assuming that a $m_1 \times n_1$, image B with a higher resolution is to be reconstructed, and g(i,j) represents a gray value of an element in row i and column j of the image B, where i=1, 2, . . . , $m_1$, and j=1, 2, . . . , $n_1$;

assuming that $$\Delta x = \frac{n_1}{n}, \Delta y = \frac{m_1}{m}, x = \frac{j}{\Delta x} \text{ and } y = \frac{i}{\Delta y},$$

if x and y are both integers, then g(i,j)=f(y,x);

if x is non-integer, y is integer, and x is rounded down to $w_x$, then $$g(i,j)=(w_x+1-x)\cdot f(y,w_x)+(x-w_x)\cdot f(y,w_x+1) \quad \text{formula (1)};$$

if x is integer, y is non-integer, and y is rounded down to $h_y$, then $$g(i,j)=(h_y+1-y)\cdot f(h_y,x)+(y-h_y)\cdot f(h_y+1,x) \quad \text{formula (2)};$$

if x is non-integer, y is non-integer, x is rounded down to $w_x$ and y is rounded down to $h_y$, then $$g(i,j)=(h_y+1-y)\cdot((w_x+1-x)\cdot f(h_y,w_x)+(x-w_x)\cdot f(h_y,w_x+1))+(y-h_y)\cdot((w_x+1-x)\cdot f(h_y+1,w_x)+(x-w_x)\cdot f(h_y+1,w_x+1)) \quad \text{formula (3)}.$$

Figure 1:
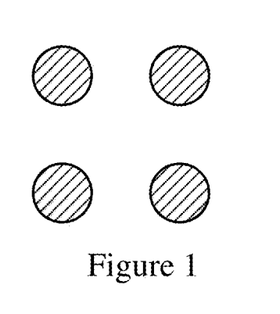
FIG. 1 is a schematic diagram of image data to be reconstructed.
Figure 2:
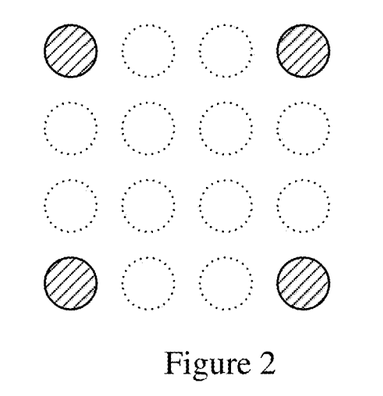
FIG. 2 is a schematic diagram of reconstructed image data.

In this way, an image as shown in FIG. 2 is reconstructed from an image as shown in FIG. 1.

Figure 3:
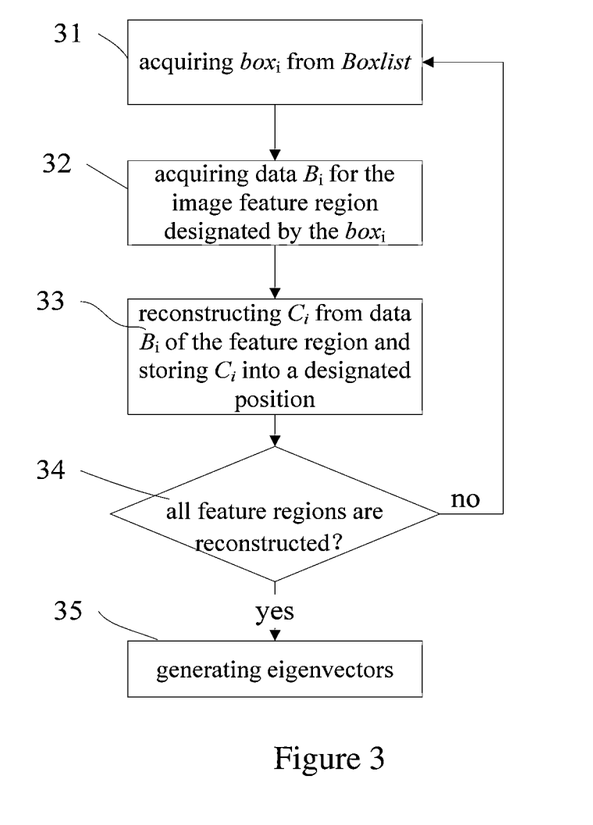
FIG. 3 is a flow chart showing image reconstruction of a feature region.

Referring to FIG. 3, extracting the feature in step 3 includes:

Step 31, assuming that a matrix $$\begin{pmatrix} a_{11} & \cdots & a_{1n} \\ \cdots & \cdots & \cdots \\ a_{m1} & \cdots & a_{mn} \end{pmatrix}$$

represents data A of a two-dimensional gray image, $a_{ij}$ represents a gray value of a pixel point in row i and column j of the image data, where i=1,2, ..., m and j=1,2, ..., n, assuming that Boxlist={box$_1$, box$_2$, ..., box$_n$} where box$_i$ represents an ith image region in the image data A from which the feature is to be extracted, acquiring box$_i$ from the Boxlist;

Step 32, acquiring data $$B_i = \begin{pmatrix} b_{11} & \cdots & b_{1q} \\ \cdots & \cdots & \cdots \\ b_{p1} & \cdots & b_{pq} \end{pmatrix}$$

for the image feature region designated by box$_i$;

Step 33, reconstructing $$C_i = \begin{pmatrix} c_{11} & \cdots & c_{1t} \\ \cdots & \cdots & \cdots \\ c_{u1} & \cdots & c_{ut} \end{pmatrix}$$

from data 13, of the feature region and storing $C_i$ into a designated position, where t>q and u>p;

Step 34, determining whether all feature regions are reconstructed, executing step 35 if all feature regions are reconstructed, and repeating step 31 to step 33 to acquire a group of image regions $C_1, C_2, \ldots, C_n$ if not all feature regions are reconstructed; and Step 35, extracting needed features from the image regions $C_1, C_2, \ldots, C_n$ to form eigenvectors $\beta_1, \beta_2, \ldots, \beta_n$.

According to the embodiment, during the sheet-medium recognition, image of feature regions are reconstructed with the image reconstruction method in this embodiment by utilizing priori coordinate information of the feature regions, so as to improve signal to noise ratio and improve recognition accuracy without modifying hardware resource.

Figure 6:
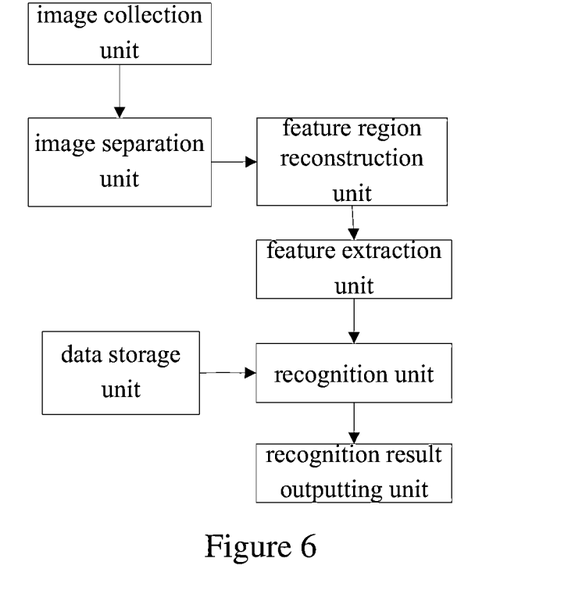
FIG. 6 is a structural diagram of a sheet-medium recognition device.

Referring to FIG. 6, the sheet-medium recognition device according to the embodiment includes:

an image collection unit, configured to acquire image information of a sheet-medium to be recognized;

an image separation unit configured to implement adaptive separation on the image of the sheet medium;

a feature region reconstruction unit, configured to implement image reconstruction for a feature region, and store the reconstructed image data of the feature region into a designated position;

a feature extraction unit, configured to extract a feature from the reconstructed image data of the feature region to form an eigenvector;

a data storage unit, configured to store position information of preset feature regions, standard template data, and other necessary data information needed for the recognition;

a recognition unit, configured to classify and recognize an input eigenvector; and a recognition result outputting unit, configured to output a result for the classification and recognition which is acquired by the recognition unit.

In the sheet-medium recognition method according to the disclosure, an image is reconstructed according to priori information of feature regions to improve quality of the image, which is beneficial for improving recognition accuracy. Since the reconstruction is performed only in the regions for which features are to be extracted, storage space consumption is reduced, thereby not only saving a lot of storage space and time, improving resource utilization rate, but also effectively improving recognition accuracy, and reaching a good balance between resource and efficiency. The sheet-medium recognition device provides hardware and algorithm supports for the recognition method.

The foregoing embodiments are only preferred embodiments of the disclosure and are not meant to limit the disclosure, any equivalent change made according to the specification and the drawings of the disclosure shall fall in the scope of the claims of the disclosure.

The invention claimed is:

1. A sheet-medium recognition method comprising:
step 1, collecting image information;
step 2, separating image information of an object to be recognized out of the collected image information;
step 3, reconstructing image data of a feature region, and extracting a feature from the reconstructed image data to form an eigenvector; and
step 4, inputting the eigenvector into a classifier trained through standard data to acquire a recognition result.

2. The sheet-medium recognition method according to claim 1, wherein reconstructing the image data of the feature region in step 3 comprises:

assuming that image information of the object to be recognized is A, A is a m×n image, and f(h,w) represents a gray value of an element in row h and column w of the image A wherein h=1,2, ..., m and w=1,2, ..., n; and assuming that a $m_1 \times n_1$ image B with a higher resolution is to be reconstructed, and g(i,j) represents a gray value of an element in row i and column j of the image B, wherein i=1,2, ..., $m_1$, and j=1, 2, ..., $n_1$;

assuming that $$\Delta x = \frac{n_1}{n}, \Delta y = \frac{m_1}{m}, x = \frac{j}{\Delta x} \text{ and } y = \frac{i}{\Delta y};$$

if x and y are both integers, then g(i,j)=f(y,x);
if x is non-integer, y is integer, and x is rounded down to $w_x$, then $$g(i,j)=(w_x+1-x) \cdot f(y,w_x)+(x-w_x) \cdot f(y,w_x+1)$$

if x is integer, y is non-integer, and y is rounded down to $h_y$, then $$g(i,j)=(h_y+1-y) \cdot f(h_y,x)+(y-h_y) \cdot f(h_y+1,x)$$

if x is non-integer, y is non-integer, x is rounded down to $w_x$ and y is rounded down to $h_y$, then $$g(i,j)=(h_y+1-y) \cdot ((w_x+1-x) \cdot f(h_y,w)+(x-w_x) \cdot f(h_y,w_x+1))+ \\ (y-h_y) \cdot ((w_x+1-x) \cdot f(h_y+1,w_x)+(x-w_x) \cdot f(h_y+1,w_x+ \\ 1)).$$

3. The sheet-medium recognition method according to claim 1, wherein extracting the feature in step 3 comprises:
step 31, assuming that a matrix $$\begin{pmatrix} a_{11} & \cdots & a_{1n} \\ \cdots & \cdots & \cdots \\ a_{m1} & \cdots & a_{mn} \end{pmatrix}$$

represents two-dimensional gray image data A, $a_{ij}$ represents a gray value of a pixel point in row i and column j of the image data, wherein i=1,2, ..., m and j=1,2, ..., n, assuming that Boxlist={box$_1$, box$_2$, ..., box$_n$}, wherein box$_i$ represents an ith image region in the image data A from which the feature is to be extracted, acquiring box$_i$ from the Boxlist;

step 32, acquiring data $$B_i = \begin{pmatrix} b_{11} & \ldots & b_{1q} \\ \ldots & \ldots & \ldots \\ b_{p1} & \ldots & b_{pq} \end{pmatrix}$$

for the feature region designated by $box_i$;

step 33, reconstructing $$C_i = \begin{pmatrix} c_{11} & \ldots & c_{1t} \\ \ldots & \ldots & \ldots \\ c_{u1} & \ldots & c_{ut} \end{pmatrix}$$

from data $B_i$ of the feature region and storing $C_i$ into a designated position, wherein $t > q$ and $u > p$;

step 34, determining whether all feature regions are reconstructed, executing step 35 if all feature regions are reconstructed, and repeating step 31 to step 33 to acquire a group of image regions $C_1, C_2, \ldots, C_n$ if not all feature regions are reconstructed; and step 35, extracting needed features from the image regions $C_1, C_2, \ldots, C_n$ to form eigenvectors $\beta_1, \beta_2, \ldots, \beta_n$.

4. A sheet-medium recognition device comprising:

an image collection unit, configured to acquire image information of a sheet medium to be recognized;

an image separation unit configured to implement adaptive separation on the image of the sheet medium;

a feature region reconstruction unit, configured to implement image reconstruction for a feature region, and store the reconstructed image data of the feature region into a designated position;

a feature extraction unit, configured to extract a feature from the reconstructed image data of the feature region to form an eigenvector;

a data storage unit, configured to store position information of preset feature regions and standard template data;

a recognition unit, configured to classify and recognize an input eigenvector; and a recognition result outputting unit, configured to output a result for the classification and recognition which is acquired by the recognition unit.

* * * * *